United States Patent
Duch et al.

(10) Patent No.: US 9,139,041 B2
(45) Date of Patent: Sep. 22, 2015

(54) ARRANGEMENT OF A WHEEL HUB CONNECTED TO A CONSTANT VELOCITY JOINT PROVIDED WITH A FLEXIBLE SEAL DEVICE

(71) Applicant: Aktiebolaget SKF, Göteborg (SE)

(72) Inventors: Daniele Duch, San Gillio (IT); Fausto Morello, Sommariva del Bosco (CN) (IT); Andrea Serafini, Pinerolo TO (IT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/306,609

(22) Filed: Jun. 17, 2014

(65) Prior Publication Data
US 2014/0376848 A1    Dec. 25, 2014

(30) Foreign Application Priority Data
Jun. 19, 2013   (IT) .............. TO2013A0507

(51) Int. Cl.
*F16C 33/76* (2006.01)
*F16C 33/80* (2006.01)
*B60B 27/00* (2006.01)
(Continued)

(52) U.S. Cl.
CPC ........... *B60B 27/0073* (2013.01); *F16C 33/583* (2013.01); *F16C 33/768* (2013.01); *F16C 33/7883* (2013.01); *F16C 33/80* (2013.01); *F16C 41/007* (2013.01); *B60B 27/0005* (2013.01); *B60B 27/0068* (2013.01); *F16C 19/186* (2013.01); *F16C 2326/02* (2013.01); *F16D 2300/08* (2013.01)

(58) Field of Classification Search
CPC ...... F16C 19/189; F16C 33/583; F16C 33/80; F16C 33/761; F16C 33/7853; F16C 2326/02; F16C 33/7859; B60B 27/0005; B60B 27/0073; B60B 27/0068
USPC ......... 384/448, 477, 480, 482, 484–486, 488, 384/544, 546; 324/173–174, 207.25
See application file for complete search history.

(56) References Cited

U.S. PATENT DOCUMENTS

| | | | | |
|---|---|---|---|---|
| 4,946,296 | A | * | 8/1990 | Olschewski et al. .......... 340/682 |
| 5,131,763 | A | * | 7/1992 | Caron ........................... 384/448 |

(Continued)

FOREIGN PATENT DOCUMENTS

| | | |
|---|---|---|
| DE | 102008017409 A1 | 10/2009 |
| EP | 2042755 A2 | 4/2009 |

(Continued)

*Primary Examiner* — Marcus Charles
(74) *Attorney, Agent, or Firm* — Bryan Peckjian; SKF USA Inc. Patent Dept.

(57) ABSTRACT

An arrangement including a portion of a radially outer lateral surface of an inner ring of wheel hub on which an annular step is formed on the side of a constant velocity joint. The step is an L-shaped fold of a sleeve portion of a first shield that is protrudingly mounted, a flange portion of which shield radially extends so as to protrude towards an outer ring of a wheel hub, in front of a flange portion of a second shield; the L-shaped fold defines, with a wing thereof, a tubular element arranged straddling wheel hub and an outer ring of the constant velocity joint, which has a free end supporting an annular seal; an annular signal generating insert completely covers a face of the flange portion where it is provided with a shallow recess defining, together with the L-shaped fold, a thrust shoulder for mounting the first shield.

10 Claims, 1 Drawing Sheet

(51) Int. Cl.
*F16C 33/78* (2006.01)
*F16C 41/00* (2006.01)
*F16C 33/58* (2006.01)
*F16C 19/18* (2006.01)

(56) References Cited

U.S. PATENT DOCUMENTS

| | | | |
|---|---|---|---|
| 6,186,667 B1 * | 2/2001 | Nakamura et al. | 324/207.25 |
| 6,682,221 B2 * | 1/2004 | Rutter et al. | 324/174 |
| 7,350,976 B2 * | 4/2008 | Ohtsuki et al. | 384/489 |
| 8,210,752 B2 * | 7/2012 | Kamikawa et al. | 384/544 |
| 2006/0188189 A1 * | 8/2006 | Serafini et al. | 384/448 |

FOREIGN PATENT DOCUMENTS

| | | | | |
|---|---|---|---|---|
| EP | 2043880 A1 | 4/2009 | | |
| EP | 2541107 A1 | 1/2013 | | |
| EP | 2541108 A1 | 1/2013 | | |
| JP | H1193961 A | 4/1999 | | |
| JP | 2003130069 A * | 5/2003 | | F16C 33/78 |
| JP | 2007285374 A | 11/2007 | | |
| WO | WO 2008006339 A1 * | 1/2008 | | F16C 33/78 |
| WO | 2009140996 A | 9/2009 | | |

* cited by examiner

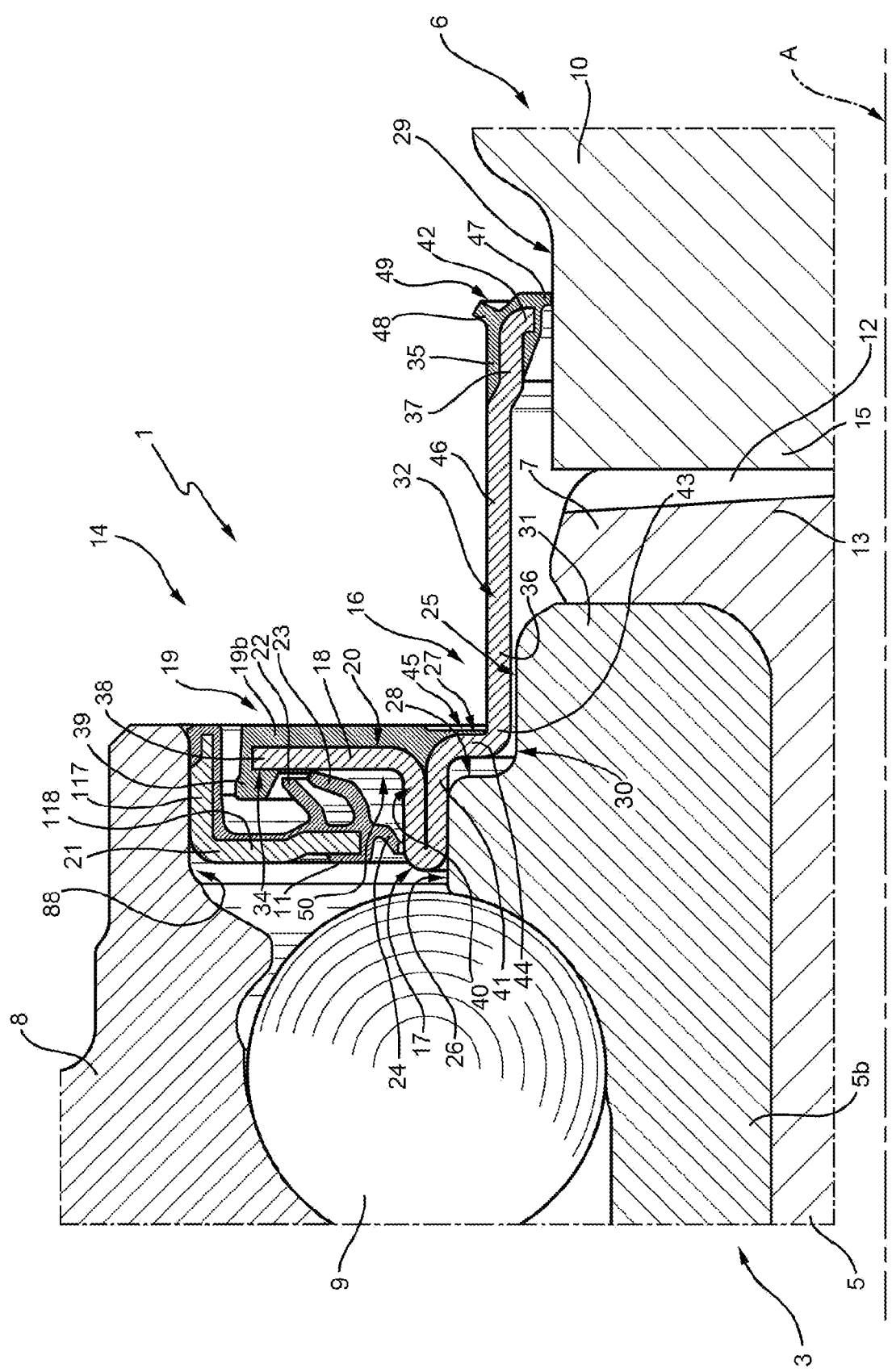

ARRANGEMENT OF A WHEEL HUB CONNECTED TO A CONSTANT VELOCITY JOINT PROVIDED WITH A FLEXIBLE SEAL DEVICE

CROSS-REFERENCE TO RELATED APPLICATIONS

This application claims priority to Italian Patent Application TO2013A000507 filed Jun. 19, 2013, the contents of which are herein fully incorporated by reference.

TECHNICAL FIELD OF THE INVENTION

The present invention relates to a seal device for wheel hub assemblies connected to constant velocity joints and to the respective arrangement thereof, having an improved seal action, together with low operating friction and a simplified structure.

BACKGROUND OF THE INVENTION

Wheel hub assemblies, on the one hand, support a vehicle wheel and, if the wheel is a drive wheel, are angularly connected to a related constant velocity joint for the transmission of the driving torque from the axle shaft to the wheel itself. Wheel hub assemblies have an axis of rotation and comprise an inner ring and an outer ring which are coaxial to each other and to the axis of rotation, and are rotatable with respect to each other due to the interposition therebetween of two crowns of rolling bodies.

KNOWN ART

The transmission of driving torque from the constant velocity joint to the wheel hub assembly is ensured by conjugated toothed means for transmitting motion, present on the adjacent and facing ends of the wheel hub and of the outer ring of the constant velocity joint; the toothed means may consist of a classical spline coupling, or of a front toothing pair, which couple head to head, as disclosed in WO2009/140996, in EP2042755, or again in EP2043880 (also published as WO2008/006339).

In particular, in the case of front toothings, the joint area between wheel hub and constant velocity joint is to be protected from infiltrations by outside contaminants (water, dust, mud, dirt); the same applies to the rolling bodies mounted interposed between the inner ring and the outer ring, which is provided with the means for securing the suspension to the upright.

Such a protection is obtained according to EP2043880 by means of a single sealing assembly obtained from two opposed shields, a first one fixed in axial abutment on the inner ring, on the side facing the constant velocity joint, and a second one fixed to the outer ring and carrying a sealing ring equipped with one or more sliding lips, which cooperate in contact with the first shield. The first shield has an axial "leg", or sleeve portion, made by means of a double fold and which extends so as to protrude, with a free end thereof, from the inner ring of the bearing formed by the wheel hub and towards the outer ring of the constant velocity joint, to cover the joint area. This protruding part may be provided with an annular sealing seal which cooperates radially in axial abutment with a shoulder of the outer ring of the constant velocity joint; furthermore, the protruding part, or the face of a flange part, or "radial leg" of the first shield, facing in use the constant velocity joint may be provided with an annular signal generating element (also called "phonic wheel") formed, if the shield is made of ferromagnetic metal material, by alternating inserts and depressions, or by an annular portion of a seal made of a magnetizable elastomeric or plastic-based material, magnetized so as to have alternating magnetized and non-magnetized areas, or areas with opposite polarities. Once in use coupled to a suitable sensor, the "phonic wheel", which based on what is said is integral with the inner ring of the bearing, generates a signal which, generally, is used to detect the rotation speed of the vehicle wheel.

The solution according to EP2043880 leaves a limited space available for the sensor operatively associated with the "phonic wheel", is relatively complex to mount and relatively cumbersome and, especially, due to the double axial abutment, may be subjected in use to buckling stresses which, when present, may cause undesired and uncontrolled deformations which, on the one hand, reduce the sealing action towards the external contaminants and, on the other hand, may create alterations in the signal emitted by the sensor.

A solution is known from EP2541107 by the same Applicant, which brilliantly overcomes all the drawbacks of the known art. However, albeit satisfactory, this solution involves reducing the radial extension of the magnetized rubber element forming the phonic wheel and using two separate and independent sealing assemblies for the rings of the wheel hub and for the conjugated toothed means for transmitting motion, present on the adjacent and facing ends of the wheel hub and of the outer ring of the constant velocity joint.

SUMMARY OF THE INVENTION

It is the object of the present invention to provide an arrangement of a wheel hub assembly connected to a constant velocity joint provided with a seal device which does not have the drawbacks described above, is easy and affordable to embody, has increased protection efficiency of the rolling bodies and of the coupling area between joint and wheel hub, both reduced axial and radial bulks, which leave more space for the sensor, all allowing the generation of an ever-strong and reliable magnetic signal to be obtained from the sensor, a significant reduction of the friction generated by the sliding of the lips of the seal ring on the first shield, and simplified assembly.

Hence, based on the invention, an arrangement of a wheel hub assembly connected to a constant velocity joint provided with a seal device is provided, as defined in claim 1.

Thereby, a compact assembly structure is obtained of the device, with both reduced axial and radial bulks, using a reduced number of components, which structure is easy to mount, without subjecting the parts with substantial axial length to maximum loads. An excellent fluid-tight seal is equally obtained both of the areas adjacent to the joint and the wheel hub and of the space between the outer and inner rings of the wheel hub and, at the same time, sufficient space is ensured to allow the "phonic wheel" to generate an ever-reliable magnetic signal, combined with a significant reduction of the friction between the relatively mobile parts in contact of the seal device.

BRIEF DESCRIPTION OF THE DRAWINGS

Further features and advantages of the present invention will become more apparent from the following description of a non-limiting embodiment thereof, which diagrammatically illustrates a longitudinal view in radial section of a seal device applied to a wheel hub assembly connected to a constant velocity joint according to the invention, which are illustrated only in part for simplicity.

DETAILED DESCRIPTION OF THE INVENTION

With reference to the above-mentioned FIGURE, numeral 1 indicates a seal device as a whole for a wheel hub assembly 3, which inner ring 5 is operatively associated, for rotating integrally thereto, with a constant velocity joint 6, known and therefore illustrated only in part for simplicity. The wheel hub assembly 3 further comprises an outer ring 8 mounted coaxial and concentric with ring 5, radially externally to ring 5, and a plurality of rolling bodies 9 interposed between the rings 5 and 8. The inner ring 5 comprises a ring 5*b* (insert ring or "SIR"), made as an independent element blocked axially by a rolled edge 7 and delimited externally by an outer cylindrical lateral surface 26, while the constant velocity joint 6 comprises an outer ring 10 of the constant velocity joint (the only part of the constant velocity joint 6 that is shown in the drawing) provided with an outer cylindrical lateral surface 29, arranged normally substantially coaxial to ring 5, and with a toothed coupling 12 with the inner ring 5 having front toothing obtained on reciprocally adjacent portions 13, 15 of edge 7 and of the outer ring 10.

Device 1 comprises a sealing assembly 14 interposed in use between the inner ring 5 (in this case ring 5*b*) and the outer ring 8 protecting the rolling bodies 9, and also arranged in the way disclosed below, straddling the wheel hub 3 and the outer ring 10 of joint 6, so as to extend straddling the wheel hub 3 and the outer ring 10 of the constant velocity joint to protect the toothed coupling 12.

The sealing assembly 14 comprises: two shields 16 and 21 arranged facing each other and fitted angularly onto the inner ring 5 and inside the outer ring 8, respectively; and an annular sealing element 11, made of an elastomeric material, integrally carried, in the non-limiting embodiment disclosed, by shield 21 and comprising a plurality of annular lips 22, 23, 24.

Shield 16 comprises a sleeve portion 17 by means of which it is integrally anchored in use to the inner ring 5 (5*b*) and a flange portion 18, which radially extends so as to protrude from the sleeve portion 17 and towards the other shield 21 on the side of the sleeve portion 17 in use facing the constant velocity joint 6.

Shield 21 is L-shaped in radial section and in turn comprises a sleeve portion 117 which is anchored in use angularly integral and fluid-tightly to ring 8, in particular within a front annular seat 88 of the outer ring 8 facing the constant velocity joint 6, and a flange portion 118, which radially extends so as to protrude on the interior of the sleeve portion 117 on the side opposite to the constant velocity joint 6 and towards the inner ring 5.

Shield 16 has complex shape, because the sleeve portion 17 comprises a first stretch defined by a first L-shaped fold 40 which axially extends so as to protrude from the flange portion 18 and towards shield 21, and a second stretch defined by a U-shaped fold 41, radially overlapping in contact with the first stretch on the side of the inner ring 5 and which axially extends backwards with respect to the first L-shaped fold 40, towards the constant velocity joint 6 and beyond the flange portion 18.

The U-shaped fold 41 defining the second stretch ends on the opposite side of fold 40 defining the first stretch with a second L-shaped fold 43 of shield 16, which is preferably made by means of a sheared and folded plate. Fold 43 extends radially towards the interior of the sleeve portion 17 and axially protrudes from the flange portion 18 on the opposite side of fold 40, protruding in use from the inner ring 5 and towards the constant velocity joint 6, to form a cylindrical tubular element 32 adapted to be arranged in use straddling the wheel hub 3 and the constant velocity joint 6, concentric with the inner ring 5.

The flange portion 18, which is arranged in front of the flange portion 118 and within seat 88, supports, towards the outside of seat 88 and joint 6, on a respective front face 20 facing in \use joint 6, a signal generating element 19 (generating a magnetic signal in the example disclosed) defined by a flat annular insert 19*b*, which has a substantially rectangular radial section with constant axial thickness, and is made of a magnetizable elastomeric or plastic synthetic material, which was magnetized and anchored to face 20. The annular insert 19*b* has a plurality of magnetized and non-magnetized areas alternating about an axis A, or a plurality of magnetized areas with opposite polarity; once the element or annular insert 19*b* is operatively coupled with a sensor, known and not disclosed, such a sensor transduces the magnetic signal thus providing the rotation speed of ring 5.

Based on what is described, the shields 16 and 21 are anchored by means of respective sleeve portions 17 and 117 thereof, to the inner ring 5 and to the outer ring 8, respectively, of the wheel hub 3 and the respective flange portions 18 and 118 of each shield 16 and 21 extend radially so as to protrude from the sleeve portions 17 and 117 towards the other shield.

According to a first aspect of the invention, the seal device 1 also comprises, as an integral part thereof, a stretch 30 of a radially outer lateral surface 26 of the inner ring (in this case 5*b*) on which an annular step 25 is obtained on the side of the constant velocity joint 6 and at an end 31 of the inner ring 5 (5*b*) facing the constant velocity joint 6, therefore on the opposite side of shield 21.

Furthermore, in combination, the L-shaped fold 43 of shield 16 is accommodated with axial clearance into the annular step 25 and is shaped so as to define with a first wing 44 thereof, parallel to the flange portion 18, a first axial and annular shoulder 27, facing in use the constant velocity joint 6; wing 44 and, accordingly, shoulder 27 defined thereby, are arranged axially spaced apart from a second axial shoulder 28, defined by the annular step 25; shoulder 27 also protrudes axially into the annular step 25 with respect to face 20 of the flange portion 18 of shield 16, which face 20 faces on the opposite side of the first stretch formed by the L-shaped fold 40 of the sleeve portion 17 of shield 16. Therefore, there is an axial clearance between wing 44 and shoulder 28, on the opposite side of shoulder 27.

Again combined with what is described above, the sleeve portion 17 is fluid-tightly fitted onto the radially outer lateral surface 26 of the inner ring 5 (in this case 5*b*), outside the annular step 25 and in a position immediately adjacent to the annular step 25.

According to a further aspect of the invention, the annular insert 19*b* forming the signal generating element 19 also protrudes axially from face 20 of the flange portion 18 and is shaped so as to completely cover face 20 and also extend onto the L-shaped fold 43 and the first wing 44, so as to also cover the axial shoulder 27 defined by wing 44.

The fact that fold 43 and, in particular, wing 44 thereof, also axially protrudes with respect to face 20, but slightly less than the annular insert 19*b* axially protrudes from face 20, allows insert 19*b* to be mechanically better supported. Due to the geometry described, the annular insert 19*b* is also provided with a shallow recess 45 which is arranged on the opposite side of the first wing 44 of the L-shaped fold 43 and at the first wing 44; the shallow recess 45 is thereby adapted to define, together with the first wing 44 of the L-shaped fold 43, which according to what is described, is arranged immediately beneath the shallow recess 45, a first thrust shoulder for mounting in use shield 16 on the radially outer lateral surface 26 of the inner ring 5.

According to a further aspect of the invention, it is a second wing 46 of the second L-shaped fold 43, arranged substantially perpendicular to the first wing 44, that defines the tubular element 32 arranged in use straddling the wheel hub 3 and the constant velocity joint 6; the L-shaped fold 43 is also accommodated so as to completely protrude into the annular step 25 and so that, in use, the annular insert 19b is arranged substantially flush with the outer ring 8 of the wheel hub 3; this is due to the fact that a first end 36 of the tubular element 32, facing the second shield 21, is accommodated with radial clearance in the annular step 25 and due to the fact that, as already described, wing 44 is axially spaced apart from shoulder 28.

Furthermore, a second end 37 of the tubular element 32 defines a free end of the second wing 46 of the L-shaped fold 43, opposite to the first wing 44 and facing in use the constant velocity joint 6; such end 37 supports an annular seal 35 made of an elastomeric material and which radially extends so as to protrude from end 37, towards the interior of the tubular element 32, over a length so as to intercept with interference, in use, a substantially cylindrical outer lateral surface 29 of the outer ring 10 of the constant velocity joint 6, to provide a radial seal thereon.

Due to the fact that the whole fold 43 protrudes both axially and radially into step 25, but with predetermined axial and radial clearances, the tubular element 32 is elastically deformable, but in controlled manner, thus allowing small movements of end 37, and this allows the radial seal action of seal 35 to be improved.

End 37 of the tubular element 32 is provided, radially on the interior, with an L-shaped edge 42 on the opposite side of a radially protruding direction of extension of the flange portion 18 of the shield 16; the L-shaped edge 42 is entirely embedded into the annular seal 35 and is adapted to define a second thrust shoulder for mounting the first shield 16 to the radially outer lateral surface 26 of the inner ring 5.

Also in this case, the geometry described allows avoiding the application of buckling stresses to the tubular element 32.

The annular seal 35 comprises a pair of annular lips 47, 48 which extend substantially on the opposite side of each other, a lip 47, in radial direction so as to cooperate in use with radial seal with the constant velocity joint 6, and a lip 48, in radially oblique direction so as to protrude from end 37 of the tubular element 32, in a position axially retracted towards the first end 36 with respect to lip 47, so as to delimit a front annular recess 49 in seal 35 adapted to allow lip 48 to act as a centrifuging element with regards to possible contaminants present in proximity of lip 47.

According to another aspect of the invention, the annular insert 19b is shaped so as to extend beyond a radially outer edge 38 of the flange portion 18, opposite to the sleeve portion 17 and towards the second shield 21, in a position immediately facing, but spaced apart from, the sleeve portion 117 of the second shield 21, so as to form an annular buttress 39 arranged facing the flange portion 118 of the second shield 21 towards which the annular buttress 39 axially extends so as to protrude from a face 34 of the flange portion 18 opposite to face 20, thus entirely incorporating edge 38, which is embedded into buttress 39.

The annular sealing element 11 comprises at least an annular lip 22 which extends so as to protrude in a position immediately adjacent to buttress 39 of the annular insert 19b and between buttress 39 and the inner ring 5, so as to cooperate, without sliding, with one of the flange portions 18, 118, in this case with the flange portion 18 of shield 16, and with buttress 39 to define a labyrinth seal between the first and second shields 16, 21 and on the side of the sleeve portion 117 of the second shield 21.

In the non-limiting embodiment disclosed, the annular sealing element 11 is integrally carried by the flange portion 118 of the second shield 21, which radially extends so as to protrude from the sleeve portion 117 on the side opposite to the side facing in use the constant velocity joint 6; the annular lip 22 obliquely extends in radial direction so as to protrude from the flange portion 118 and towards the sleeve portion 117, partially within the bulk in axial direction of buttress 39, but offset in radial direction with respect to buttress 39, so as to be radially interposed between buttress 39 and the sleeve portion 17 of shield 16.

The annular sealing element 11 further comprises at least a pair of further annular lips 23 and 24, which extend so as to protrude from the flange portion 118 in diverging directions; lip 23 cooperates sliding, with slight interference, with the flange portion 18; lip 24 instead forms a labyrinth seal with the sleeve portion 17 and therefore does not slide on the sleeve portion 17; thereby, the lips 23, 24 define, with each other and with the first shield 16, an annular chamber 50 filled in use with lubricating grease and which is interposed in radial direction between lip 23 and the sleeve portion 17 of shield 16.

It is apparent from what is described that due to the synergetic combination of the different features described, and especially to the presence of step 25, an arrangement is obtained of wheel hub 3 guided by a constant velocity joint 6 in which there is more space for the signal generating element 19, thus ensuring the generation of a magnetic signal which is always strong and reliable and, at the same time, a drastic reduction of the friction generated by the seal device 1, as well as a reduction and simplification of the components of the seal device, which reduces mounting times and production costs, the standard reduced axial and radial bulks in EP2541107 being the same.

The invention claimed is:

1. An arrangement of a wheel hub connected to constant velocity joint provided with a seal device, comprising:
   a sealing assembly disposed between an inner ring and an outer ring of the wheel hub and extends straddling between the wheel hub and an outer ring of the constant velocity joint;
   wherein the sealing assembly comprises a first shield and a second shield anchored by means of their respective sleeve portions to the inner ring and to the outer ring of the wheel hub, respectively, and having each a respective flange portion that radially extends to protrude from the sleeve portion and towards the other shield, and an annular sealing element supported by one of the first and second shields and having a plurality of annular sealing lips that cooperate with the other shield; the flange portion of the first shield externally carrying towards the constant velocity joint a signal generating element consisting of an annular insert; and the sleeve portion of the first shield comprising a first portion defined by a first L-shaped fold that axially extends to protrude from the flange portion and towards the second shield, and a second portion defined by a U-shaped fold, radially overlapping in contact with the portion defined by the first L-shaped fold on the side of the inner ring and axially extends backwards with respect to the first L-shaped fold, towards the constant velocity joint and beyond the flange portion, the second portion ending, on a side opposite to the first portion, with a second L-shaped fold, which extends radially towards the interior of the sleeve portion and axially protrudes from the inner ring and with respect to the flange portion towards the constant velocity joint, thus forming a tubular element adapted to straddle between the wheel hub and the constant velocity joint, concentric with the inner ring; wherein the annular insert forming the signal generating element is provided as an annular insert having predetermined thickness, measured in the axial direction, of a magnetizable elastomeric or synthetic plastic material, which axially protrudes from the first face of the flange portion of the first shield to which the annular insert has been chemically anchored, and is shaped to completely cover the first face and extend onto the second L-shaped fold; and wherein, in combination, i) the seal device comprises a portion of a radially outer lateral surface of the inner ring on which an annular step is obtained on the side of the constant velocity joint and at an end of the inner ring facing the constant velocity joint, the annular step of the inner ring including a first axially extending surface proximate the U-shaped fold, a second axially extending surface proximate the tubular element, and a radially extending surface disposed therebetween;

ii) the second L-shaped fold is accommodated with axial clearance into the annular step and is shaped to define with a first wing thereof being configured to be parallel to the radially extending surface of the annular step, a first axial annular shoulder is configured to face the constant velocity joint and is arranged axially spaced apart from the radially extending surface defined by the annular step, the first axial shoulder axially protruding into the annular step with respect to a first face of the flange portion of the first shield facing the side opposite to the first portion of the sleeve portion of the first shield, the second L-shaped fold being spaced from the radially extending surface of the annular step and the second axially extending surface of the annular step; and iii) the sleeve portion of the first shield is fluid-tightly fitted onto the radially outer lateral surface of the inner ring, outside the annular step and in a position immediately adjacent to the annular step;

iv) the annular insert extending onto the second L-shaped fold to also cover the first axial shoulder defined by the first wing of the second L-shaped fold.

2. The arrangement according to claim 1, wherein the annular insert defining the signal generating element is provided, on a side opposite to the first wing of the second L-shaped fold and at the first wing, with a shallow recess adapted to define, together with the first wing of the L-shaped fold, which is arranged immediately beneath the shallow recess, a first thrust shoulder for mounting the first shield to the radially outer lateral surface of the inner ring.

3. The arrangement according to claim 1, further comprising a second wing of the second L-shaped fold arranged substantially perpendicular to the first wing defines the tubular element arranged in use straddling between the wheel hub and the constant velocity joint; the second L-shaped fold being accommodated to overhangingly protrude into the annular step, the annular insert arranged substantially flush with the outer ring of the wheel hub, a first end of the tubular element, facing the second shield, being accommodated with radial clearance in the annular step.

4. The arrangement according to claim 3, further comprising a second end of the tubular element, defining the free end of the second wing of the second L-shaped fold, opposite to the first wing and facing in use the constant velocity joint, supports an annular seal made of an elastomeric material and radially extends to protrude from the second end, towards the interior of the tubular element, over a length to intercept with interference, a substantially cylindrical outer lateral surface of the outer ring of the constant velocity joint, for providing a radial seal thereon.

5. The arrangement according to claim 4, wherein the second end of the tubular element is provided, radially on the interior thereof, of an edge which is L-shaped on the side opposite to a direction of radially extension of the flange portion of the first shield; the L-shaped edge of the second end of the tubular element being entirely embedded in the annular seal and being adapted to define a second thrust shoulder for mounting the first shield to the radially outer surface of the inner ring.

6. The arrangement according to claim 4, wherein the annular seal carried by the second end of the tubular element comprises a pair of annular lips, which extend substantially on an opposite side with respect to each other, a first lip in radial direction to cooperate with radial sealing action, with the constant velocity joint; and a second in oblique direction and radially protruding from the second end of the tubular element, in a position axially retracted towards the first end of the tubular element with respect to the first lip, to delimit a front annular recess in the seal, adapted to allow the second lip to act as a centrifuging element with regards to possible contaminants present in proximity of the first lip.

7. The arrangement according to claim 1, wherein the annular insert is shaped to extend beyond a radially outer edge of the flange portion of the first shield opposite to the sleeve portion of the first shield and towards the second shield, in a position immediately facing, but spaced apart from, the sleeve portion of the second shield, to form an annular buttress arranged facing the flange portion of the second shield, towards which the annular buttress axially extends to protrude from the flange portion of the first shield.

8. The arrangement according to claim 7, wherein the annular sealing element comprises a third annular lip that extends to protrude in a position immediately adjacent to the buttress of the annular insert and between the buttress of the annular insert and the inner ring, to cooperate without sliding with the flange portion of one of the first and second shields and with the buttress of the annular insert to define a labyrinth seal between the first and second shields and on the side of the sleeve portion of the second shield.

9. An arrangement of a wheel hub connected to constant velocity joint provided with a seal device, comprising:

a sealing assembly disposed between an inner ring and an outer ring of the wheel hub and extends straddling between the wheel hub and an outer ring of the constant velocity joint;

wherein the sealing assembly comprises a first shield and a second shield anchored by means of their respective sleeve portions to the inner ring and to the outer ring of the wheel hub, respectively, and having each a respective flange portion that radially extends to protrude from the sleeve portion and towards the other shield, and an annular sealing element supported by one of the first and second shields and having a plurality of annular sealing lips that cooperate with the other shield; the flange portion of the first shield externally carrying towards the constant velocity joint a signal generating element consisting of an annular insert; and the sleeve portion of the first shield comprising a first portion defined by a first L-shaped fold that axially extends to protrude from the flange portion and towards the second shield, and a second portion defined by a U-shaped fold, radially overlapping in contact with the portion defined by the first L-shaped fold on the side of the inner ring and axially extends backwards with respect to the first L-shaped fold, towards the constant velocity joint and beyond the flange portion, the second portion ending, on a side opposite to the first portion, with a second L-shaped fold, which extends radially towards the interior of the sleeve portion and axially protrudes from the inner ring and with respect to the flange portion towards the constant velocity joint, thus forming a tubular element adapted to straddle between the wheel hub and the constant velocity joint, concentric with the inner ring; wherein the annular insert forming the signal generating element is provided as an annular insert having predetermined thickness, measured in the axial direction, of a magnetizable elastomeric or synthetic plastic material, which axially protrudes from the first face of the flange portion of the first shield to which the annular insert has been chemically anchored, and is shaped to completely cover the first face and extend onto the second L-shaped fold; and wherein, in combination, i) the seal device comprises a portion of a radially outer lateral surface of the inner ring on which an annular step is obtained on the side of the constant velocity joint and at an end of the inner ring facing the constant velocity joint;

ii) the second L-shaped fold is accommodated with axial clearance into the annular step and is shaped to define with a first wing thereof, parallel to the flange portion of the first shield, a first axial and annular shoulder, facing the constant velocity joint and arranged axially spaced apart from a second axial shoulder, defined by the annular step, the first axial shoulder axially protruding into the annular step with respect to a first face of the flange portion of the first shield facing the side opposite to the first portion of the sleeve portion of the first shield; and iii) the sleeve portion of the first shield is fluid-tightly fitted onto the radially outer lateral surface of the inner ring, outside the annular step and in a position immediately adjacent to the annular step;

iv) the annular insert extending onto the second L-shaped fold to also cover the first axial shoulder defined by the first wing of the second L-shaped fold, the annular insert is shaped to extend beyond a radially outer edge of the flange portion of the first shield opposite to the sleeve portion of the first shield and towards the second shield, in a position immediately facing, but spaced apart from, the sleeve portion of the second shield, to form an annular buttress arranged facing the flange portion of the second shield, towards which the annular buttress axially extends to protrude from the flange portion of the first shield, the annular sealing element comprises a third annular lip that extends to protrude in a position immediately adjacent to the buttress of the annular insert and between the buttress of the annular insert and the inner ring, to cooperate without sliding with the flange portion of one of the first and second shields and with the buttress of the annular insert to define a labyrinth seal between the first and second shields and on the side of the sleeve portion of the second shield, wherein the annular sealing element is integrally supported by the flange portion of the second shield, which radially extends to protrude from the sleeve portion of the second shield on the side opposite to the side facing the constant velocity joint; the third annular lip extends in radial direction obliquely protruding from the flange portion of the second shield and towards the sleeve portion of the second shield, partially within an axial bulk of the buttress of the annular insert, to be radially disposed between the buttress and the inner ring.

10. The arrangement according to claim 9, wherein the annular sealing element of the first sealing assembly further comprises a fourth and a fifth annular lip, which extend to protrude from the flange portion of the second shield in diverging directions, the fourth lip for cooperating in sliding manner with the flange portion of the first shield, and the fifth lip by forming a labyrinth seal towards the sleeve portion of the first shield.

* * * * *